(12) United States Patent
Gohman

(10) Patent No.: US 7,520,622 B2
(45) Date of Patent: Apr. 21, 2009

(54) DISPLAY DOCK WITH INTEGRATED DISPLAY SCREEN

(75) Inventor: Jeffrey A. Gohman, Hillsboro, OR (US)

(73) Assignee: Infocus Corporation, Wilsonville, OR (US)

( * ) Notice: Subject to any disclaimer, the term of this patent is extended or adjusted under 35 U.S.C. 154(b) by 461 days.

(21) Appl. No.: 11/293,666

(22) Filed: Dec. 2, 2005

(65) Prior Publication Data

US 2007/0126988 A1   Jun. 7, 2007

(51) Int. Cl.
G03B 21/30 (2006.01)
G03B 21/28 (2006.01)
G03B 21/56 (2006.01)
H04N 5/64 (2006.01)

(52) U.S. Cl. ............... 353/72; 353/73; 353/77; 353/78; 353/119; 348/794; 359/460

(58) Field of Classification Search .......... 353/72–80, 353/119, 122, 30; 348/794; 359/460, 461
See application file for complete search history.

(56) References Cited

U.S. PATENT DOCUMENTS

| | | | |
|---|---|---|---|
| 5,347,324 A * | 9/1994 | Sasaki et al. | 348/789 |
| 5,622,419 A | 4/1997 | Holder | |
| 5,664,859 A | 9/1997 | Salerno | |
| 6,626,543 B2 * | 9/2003 | Derryberry | 353/119 |
| 6,728,032 B2 | 4/2004 | Peterson | |
| 6,807,050 B1 | 10/2004 | Whitehorn | |
| 6,896,375 B2 | 5/2005 | Peterson | |
| 6,999,232 B2 | 2/2006 | Peterson | |
| 7,025,466 B2 * | 4/2006 | Hoffmeister et al. | 353/119 |
| 7,090,354 B2 * | 8/2006 | Engle et al. | 353/70 |
| 2004/0017548 A1 * | 1/2004 | Denmeade | 353/31 |
| 2005/0206854 A1 * | 9/2005 | Katase | 353/79 |

* cited by examiner

*Primary Examiner*—Diane I Lee
*Assistant Examiner*—Magda Cruz
(74) *Attorney, Agent, or Firm*—Schwabe Williamson Wyatt

(57) ABSTRACT

An apparatus for a display dock with an integrated display screen are disclosed herein.

26 Claims, 2 Drawing Sheets

DISPLAY DOCK WITH INTEGRATED DISPLAY SCREEN

TECHNICAL FIELD

Embodiments of the invention relate generally to the field of projection devices, and more particularly to a display dock with an integrated display screen.

BACKGROUND

Multimedia projection systems are popular for purposes such as conducting sales demonstrations, business meetings, classroom training, and for use in home theaters. There are many models of projection devices, each adapted for a particular purpose based on a number of factors such as performance criteria, portability, and price. Customizing a projection device for one purpose may restrict the flexibility of utilizing the device for other purposes. For example, permanently mounting a projection device so as to reduce interruption of displayed picture by movement of people about a room or to reduce possibility of movement of the projection device limits the portable aspect of the projection device.

In addition to the limitations attendant with customization of a projection device, projection devices currently in use may require cables for connecting to a power supply as well to other peripherals such as personal computers, satellite, cable, video gaming consoles, and the like. With regard to power supply, the requirement of an available power outlet in order to supply power to the projection device may not be a problem in some contexts; however, this requisite necessarily limits the environments in which a presentation made be made. Furthermore, in the context of sales demonstrations or business meetings, relying on the availability of a power outlet in the vicinity of the required placement of the projection device may be inconvenient and problematic.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION

Embodiments of the present invention include a display dock and projection system formed using the display dock. In various embodiments, the display dock includes a display screen and a docking platform coupled to the display screen, forming an integral unit. Further, the docking platform is configured to be able to removably receive a projection device. Still further, the relative disposition of the display screen and the docking platform is complementarily coordinated with the received position of the projection device, allowing the received projection device to project images onto the integral display screen of the display dock. Additionally, in various embodiments, the docking platform is configured to be able to receive and supply power to the projection device, the projection device having a battery that is recharged by the supplied power.

In the following detailed description, reference is made to the accompanying drawings which form a part hereof and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

The description may use perspective-based descriptions such as up/down, back/front, and top/bottom. Such descriptions are merely used to facilitate the discussion and are not intended to restrict the application of embodiments of the present invention.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1A:
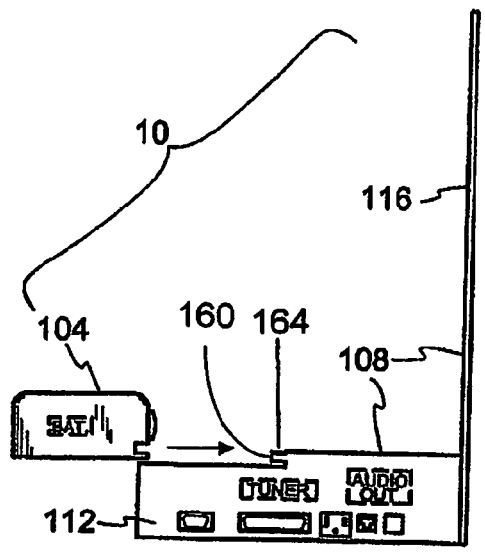
FIGS. 1A-1B illustrate a side view of a projection system formed by employing a display dock incorporated with the teachings of the present invention, in accordance with various embodiments.
Figure 1B:
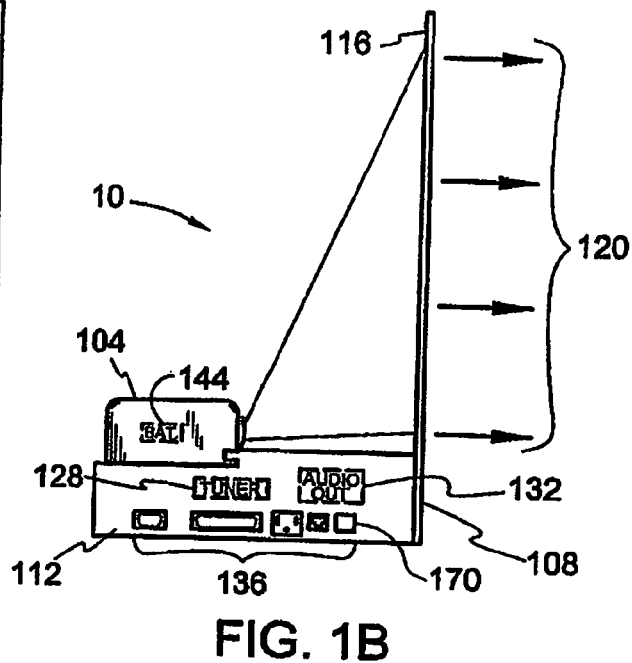
Figure 1C:
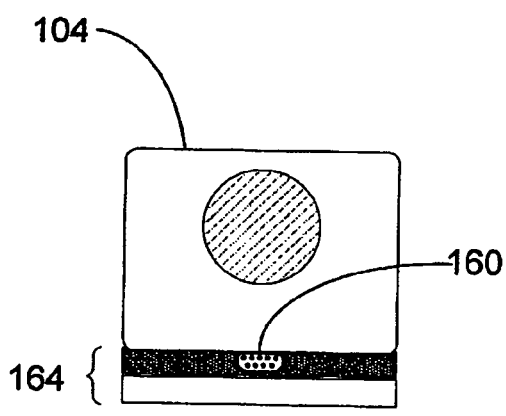
FIG. 1C illustrates a front view of a projection device suitable for practicing the present invention, in accordance with various embodiments.
Figure 1C:
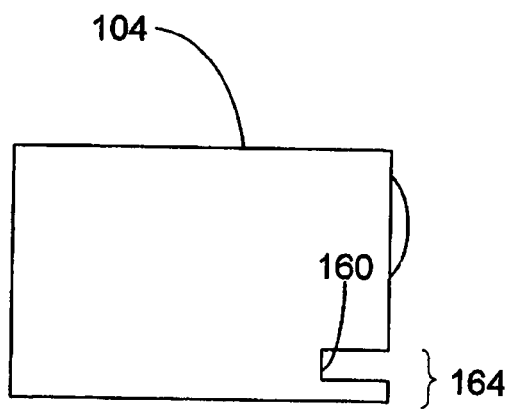

FIGS. 1A-1B illustrate a side view of a projection system 10 employing a display dock 108 and a projection device 104 incorporated with the teachings of the present invention, in accordance with various embodiments. As illustrated, for the embodiments, the display dock 108 comprises a display screen 116 and a docking platform 112 relatively disposed and coupled to the display screen 116, and configured to removably receive a projection device 104 in a manner complementary to the relative disposition of the display screen 116 and the docking platform 114, allowing the removably received projection device 104 to project images 120 onto the display screen 116. The integral display screen 116 of the display dock 108 is employed to display images 120 projected by a removably received projection device 104, with the components forming a rear-projection system.

In various embodiments in accordance with this invention, the docking platform 112 and display screen 116 may be configured to allow the removably received projection device 104 to project images frontwardly onto the display screen 116. In various ones of these embodiments, frontward projection may be either in the form of a front-projection or rear-projection system. For example, a direct and frontward projection onto a first side of a diffusion display screen 116 may display images 120 to viewers on a second side of the display screen 116 as a rear-projection system. In various embodiments, the projection device 104 and the display screen 116 may be adjusted in size, orientation, and spacing so as to produce the desired images 120 without departing from the scope of the claimed invention.

Figure 3:
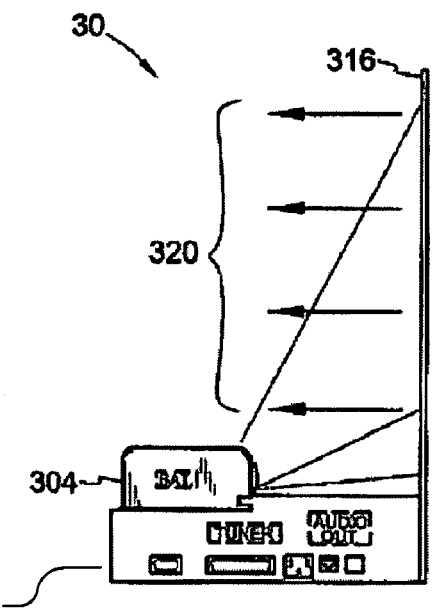
FIG. 3 illustrates an isometric view of a projection system formed by employing a display dock incorporated with the teachings of the present invention, in accordance with various embodiments.

Alternatively, FIG. 3 illustrates a projection system 30 incorporated with the teaching of the present invention, in accordance with various embodiments. For these embodiments, the docking platform 312 and display screen 316 may be configured to allow the removably received projection device 304 to project images 320 directly and frontwardly onto a first side of an opaque display screen 316 as a front-projection system. As illustrated, images 320 produced by a projection device 304 are reflected off of the display screen 316 to display the images 320. In various embodiments, the projection device 304 and the display screen 316 may be adjusted in size, orientation, and spacing so as to produce the desired images 320 without departing from the scope of the claimed invention.

Figure 2:
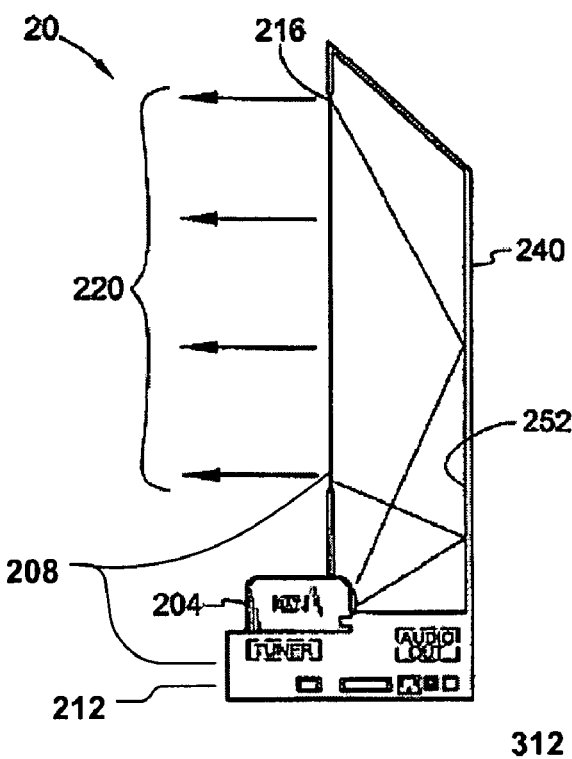
FIG. 2 illustrates an isometric view of a projection system formed by employing a display dock incorporated with the teachings of the present invention, in accordance with various embodiments.

Still further, FIG. 2 illustrates a projection system 20 employing a display dock 208 and a projection device 204 incorporated with the teachings of the present invention, in accordance with various embodiments. For the embodiments, the docking platform 212 and the display screen 216 may be configured to allow the removably received projection device 204 to project images 220 indirectly and rearwardly onto the display screen 216 as a rear-projection system. As illustrated, for the embodiments, a cabinet 240 comprises a first reflector 252 and a display screen 216. The images 220 produced by the projection device 204 are reflected off of the first reflector 252 and then projected to the display device 216. In various embodiments, the projection device 204, the first reflector 252, and display screen 216 may be adjusted in size, orientation, and spacing so as to produce the desired images 220 without departing from the scope of the claimed invention.

Figure 4:
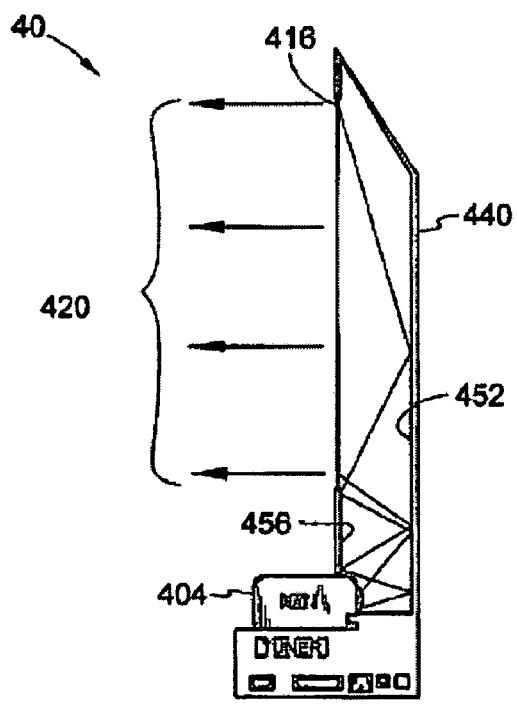
FIG. 4 illustrates an isometric view of a projection system formed by employing a display dock incorporated with the teachings of the present invention, in accordance with various embodiments; and, FIG. 5 illustrates a projection device suitable for practicing the present invention, in accordance with various embodiments.

Alternatively, FIG. 4 illustrates a projection system 40 incorporated with the teaching of the present invention, in accordance with various embodiments. For the embodiments, the integral display screen 416 displays images 420 as a rear-projection system. As illustrated, a cabinet 440 comprises a first reflector 452, a second reflector 456, and a display device 416. The images 420 produced by the projection device 404 are reflected off of the first reflector 452 and onto a second reflector 456 wherein the images are then reflected off of the second reflector 456 and back onto the first reflector 452 and the images 420 are then projected the display device 416. In various embodiments, the projection device 404 and the display screen 416 may be adjusted in size, orientation, and spacing so as to produce the desired images 420 without departing from the scope of the claimed invention.

In various embodiments in accordance with this invention, features configured to transmit and/or reflect may be designed to accommodate incident angles typical for an area of a display device in which a particular feature is employed. For example, features at the top edge of the display screen 116 may be configured to accommodate steeper projection angles than features towards the bottom of the display screen 116. Further, the docking platform 112 may be configured so as to orient the projection device 104 at such an angle and/or height as to produce the desired images 120. Finally, in various embodiments in accordance with this invention, the docking platform may further comprise an audio speaker 132 to allow for conversion of electrical signals into sound.

In various embodiments in accordance with this invention, the docking platform 112 is configured so that the projection device 104 is removably received by the docking platform 112 via an electrical interface 160 and a mechanical interface 164, represented in FIGS. 1A and 1B as similarly-shaped rectilinear forms. In various ones of these embodiments, the electrical interface 160 may be configured to utilize various communication protocols, including but not limited to RS-232 (also known as EIA232). In various ones of these embodiments, the mechanical interface 164 and the electrical interface 160 can be disposed on any desirable surface of the docking platform 112 and projection device 104, e.g., top, sides, or bottom of the docking platform 112 and the projection device 104. For example, in accordance with various embodiments of this invention, the mechanical interface 164 and electrical interface 160 may be oriented on the side of the projection device 104 and top of the docking platform 112 so that the projection device 104 may be removably coupled to the docking platform 112 by sliding the projection device 104 horizontally to engage the mechanical interface 164 and electrical interface 160 (see FIGS. 1A and 1B). Alternatively, in accordance with various embodiments of this invention, the mechanical interface 164 and electrical interface 160 may be located on the underside of the projection device 104 and topside of the docking platform 112 so that the projection device 104 may be removably coupled to the docking platform 112 by approaching the projection 104 in a downwardly and perpendicularly direction toward the docking platform 112 (not shown).

In various embodiments in accordance with this invention, the docking platform 112 may be coupled to a power source and may be configured to then supply power to the projection device 104 via the electrical interface 160. In various ones of these embodiments, the projection device 104 may be configured with a battery 144 that is adapted to be recharged by the supplied power when the projection device 104 is removably coupled to the docking platform 112. Still further, in various ones of these embodiments, the projection system 10 may be further adapted so that while the battery 144 is being recharged by the supplied power, no functionality of the projection device 104 and display dock 108 is altered, i.e., a user may recharge the battery at the same time the projection system 10 is being used.

In various embodiments in accordance with this invention, the docking platform 112 may be configured to provide video signals to the removably received projection device 104, with the removably received projection device 104 projecting images 120 based on the provided video signals. Further, in various embodiments, the projection device 104 may project images 120 based on video signals provided to the projection device 104 by the docking platform 112. In various ones of these embodiments, the docking platform 112 may include one or more functionality interfaces 136 (or 536) configured to enable the docking platform 112 to receive the video signals provided to the removably received projection device 104, or to receive video data and generate the video signals provided to the removably received projection device 104. In various ones of these embodiments, one or both of projection device 104 and docking platform 112 may be configured with functionality interfaces 136 (discussed below).

In various embodiments in accordance with this invention, the projection system 10 may be configured to permit a user to couple the projection system 10 (via projection device 104 or docking platform 112) to a number of devices to employ the projection system 10 in any number of applications including, but not limited to, home theater, videoconferencing, personal computing, and/or gaming applications. In various ones of these embodiments, the projection device 104 or docking platform 112 may include functionality interfaces 136 which may comprise any number of desired connection types. For example, in various embodiments, the functionality interfaces 136 may comprise one or more connections adapted to allow for removable storage media, Ethernet connection, satellite television connection, cable television connection, universal serial bus (USB) connection, component video connection, separated video (S-video) connection, composite connection, digital visual interface (DVI) connection, high-definition multimedia interface (HDMI) connection, a Video Electronics Standards Association M1 connection, video graphics array (VGA) connection, and/or RS-232 connection. In various embodiments in accordance with this invention, the docking platform 112 may further comprise one or more of a television tuner, a wireless communication transceiver, and a peripheral component interconnect (PCI) expansion interface.

Figure 5:
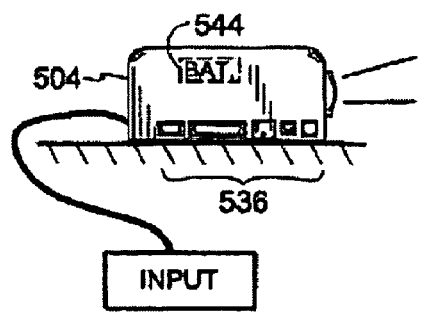

In accordance with various embodiments of the present invention, the projection device may be separated from the display dock so as to permit mobility of the projection device. This embodiment is illustrated in FIG. 5. As illustrated, the projection device 504 may be powered by a power supply or by a battery 544. The projection device 504 may include various functionality interfaces 536 which may be configured to provide power, and/or input control signals, and/or output control signals.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A display dock, comprising:
a display screen; and
a docking platform relatively disposed and coupled to the display screen, and configured to removably receive a projection device in a manner complementary to the relative disposition of the display screen and the docking platform, allowing the removably received projection device to project images directly onto the display screen.

2. The display dock of claim 1, wherein the docking platform is configured to receive the projection device in a manner complementary to the relative disposition of the docking platform and the display screen, allowing the removably received projection device to project images rearwardly onto the display screen.

3. The display dock of claim 1, wherein the docking platform is further configured to receive and supply power to the removably received projection device.

4. The display dock of claim 3, wherein the removably received projection device comprises a battery, the battery adapted to be recharged when the removably received projection device is removably coupled to the docking platform.

5. The display dock of claim 1, wherein the docking platform is further configured to provide video signals to the removably received projection device, with the removably received projection device projecting the images based on the provided video signals.

6. The display dock of claim 5, wherein the docking platform includes a functionality interface configured to enable the docking platform to receive the video signals provided to the removably received projection device, or to receive video data and generate the video signals provided to the removably received projection device.

7. The display dock of claim 6, wherein the functionality interface comprises one or more connectors selected from a group consisting of a removable storage media connector, an Ethernet connector, a satellite television received connector, a cable television connector, a universal serial bus connector, a component video connector, a separated video connector, an RCA composite connector, a digital visual interface connector, a high-density multimedia interface connector, a Video Electronics Standards Association M1 connector, a video graphics array connector, a video card connector, and an RS-232 connector.

8. The display dock of claim 5, wherein the docking platform further comprises one or more selected from the group consisting of a television tuner, a wireless communication transceiver, and a PCI expansion interface.

9. The display dock of claim 1, wherein the removably received projection device is further configured to receive video signals and project the images based on the provided video signals.

10. The display dock of claim 9, wherein the removably received projection device includes a functionality interface configured to enable the removably received projection device to receive the video signals.

11. The display dock of claim 10, wherein the functionality interface comprises one or more connectors selected from a group consisting of a removable storage media connector, an Ethernet connector, a satellite television received connector, a cable television connector, a universal serial bus connector, a component video connector, a separated video connector, an RCA composite connector, a digital visual interface connector, a high-density multimedia interface connector, a Video Electronics Standards Association M1 connector, a video graphics array connector, a video card connector, and an RS-232 connector.

12. The display dock of claim 9, wherein the removably received projection device further comprises one or more selected from the group consisting of a television a television tuner, a wireless communication transceiver, and a peripheral component interconnect (PCI) expansion interface.

13. The display dock of claim 1, wherein the display screen is configured to accommodate projection angles according to the relative disposition of the display screen and the docking platform.

14. A projection device, comprising:
a housing configured to removably couple to a display dock having a display screen and a docking platform, wherein the projection device couples to the display dock in a manner complementary to the relative disposition of the display screen and the docking platform, allowing the projection device to project images directly onto the display screen when the projection device is removable coupled to the display dock; and
a battery adapted to be recharged by a power source.

15. The projection device of claim 14, wherein the display dock is further configured to receive and supply power to the projection device when the projection device is removably coupled to the display dock.

16. The projection device of claim 15, wherein the battery is adapted to be recharged by the power supplied by the display dock when the projection device is removably coupled to the display dock.

17. The projection device of claim 14, further configured to project images rearwardly onto the display screen when the projection device is removably coupled to the display dock.

18. The projection device of claim 14, further configured to receive video signals and project the images based on the provided video signals.

19. The projection device of claim 18, further including a functionality interface configured to enable the projection device to receive the video signals.

20. The projection device of claim 19, wherein the functionality interface comprises one or more connectors selected from a group consisting of a removable storage media connector, an Ethernet connector, a satellite television received connector, a cable television connector, a universal serial bus connector, a component video connector, a separated video connector, an RCA composite connector, a digital visual interface connector, a high-density multimedia interface connector, a video graphics array connector, a video card connector, and an RS-232 connector.

21. The projection device of claim 18, wherein the projection device further comprises one or more selected from the group consisting of a television, a wireless communication transceiver, and a peripheral component interconnect (PCI) expansion interface.

22. A system, comprising:
a display screen;
a docking platform relatively disposed and coupled to the display screen, and configured to removably receive a projection device in a manner complementary to the relative disposition of the display screen and the docking platform, allowing the removably received projection device to project images directly onto the display screen when the projection device is removeably coupled to the display dock; and
projection device, comprising:
a housing configured to be removably received by a display dock; and
a battery adapted to be recharged by a power source.

23. The system of claim 22, wherein the docking platform is further configured to receive and supply power to the projection device when the docking platform removably receives the projection device.

24. A system, comprising:
a display screen,
a docking platform relatively disposed and coupled to the display screen, and configured to removably receive a projection device in a manner complementary to the relative disposition of the display screen and the docking platform, allowing the removably received projection device to project images onto the display screen; and
a cabinet having a first reflector and a second reflector, the first reflector being configured to reflect an image produced by the projection device onto the second reflector, the second reflector being configured to reflect the image from the first reflector back onto the first reflector, and the first reflector further being configured to reflect the image from the first reflector to the display screen.

25. The system of claim 24, wherein the docking platform is further configured to receive and supply power to the removably received projection device.

26. The system of claim 25, wherein the removably received projection device comprises a battery, the battery adapted to be recharged when the removably received projection device is removably coupled to the docking platform.

* * * * *